United States Patent
Langen

(10) Patent No.: US 7,185,742 B2
(45) Date of Patent: Mar. 6, 2007

(54) DRIVE AXLE WITH INTEGRATED ELECTRIC MOTOR FOR A HYDRAULIC PUMP

(75) Inventor: Alfred Langen, Grossostheim-Ringheim (DE)

(73) Assignee: Linde Aktiengesellschaft, Wiesbaden (DE)

( * ) Notice: Subject to any disclaimer, the term of this patent is extended or adjusted under 35 U.S.C. 154(b) by 587 days.

(21) Appl. No.: 10/783,899

(22) Filed: Feb. 20, 2004

(65) Prior Publication Data

US 2004/0163893 A1 Aug. 26, 2004

(30) Foreign Application Priority Data

Feb. 22, 2003 (DE) ................. 103 07 622

(51) Int. Cl.
*B66B 9/20* (2006.01)
(52) U.S. Cl. .............. 187/224; 187/233; 180/53.4
(58) Field of Classification Search ........ 187/222–224, 187/233, 234, 228, 230, 237, 238; 182/12, 182/37, 53.4, 65, 5; 180/342, 367, 383, 141–149, 180/305; 414/630, 634, 635
See application file for complete search history.

(56) References Cited

U.S. PATENT DOCUMENTS

| | | | | |
|---|---|---|---|---|
| 4,258,825 A | * | 3/1981 | Collins .................... | 182/14 |
| 5,740,887 A | * | 4/1998 | Unger et al. ............. | 187/231 |
| 6,296,081 B1 | * | 10/2001 | Nagai et al. ............. | 187/394 |
| 2002/0092687 A1 | | 7/2002 | Forster | |
| 2003/0127289 A1 | * | 7/2003 | Elgas et al. .............. | 187/224 |
| 2006/0065467 A1 | * | 3/2006 | Schuh ..................... | 180/305 |
| 2006/0151249 A1 | * | 7/2006 | Kluver et al. ............ | 187/224 |

* cited by examiner

*Primary Examiner*—Jonathan Salata
(74) *Attorney, Agent, or Firm*—The Webb Law Firm

(57) ABSTRACT

The invention relates to a drive axle (A) for a self-propelled work machine, in particular an industrial truck, in which two traction motors (EF1, EF2) spaced apart from each other and an electric motor (E1) arranged axially in between them and provided to drive a hydraulic pump (P1) are integrated. In order to utilize the installation space available optimally, according to the invention the electric motor (E1) is arranged at right angles to the traction motors (EF1, EF2), as based on the longitudinal center line of the drive axle (A).

9 Claims, 2 Drawing Sheets

DRIVE AXLE WITH INTEGRATED ELECTRIC MOTOR FOR A HYDRAULIC PUMP

CROSS-REFERENCE TO RELATED APPLICATION

This application corresponds to German Application No. 103 07 622.0 filed Feb. 22, 2003, which is herein incorporated by reference in its entirety.

BACKGROUND OF THE INVENTION

The invention relates to a drive axle for a self-propelled work machine, in particular an industrial truck, in which two traction motors spaced apart from each other and an electric motor arranged axially between them and provided for driving a hydraulic pump are integrated.

A drive axle of the generic type is described in DE 100 63 167 A1. There, in an exemplary embodiment, two traction motors constructed as electric disc rotor motors (axial field motors) are provided. There is therefore sufficient space axially in between the two traction motors arranged in the region of the drive wheels for the arrangement of an electric motor and a hydraulic pump driven thereby.

However, if conventional radial field motors, for example three-phase asynchronous motors, are used instead of the disc rotor motors (axial field motors), then it is difficult to accommodate an electric motor which is sufficiently large to drive the hydraulic pump and, if appropriate, also the pump in the remaining space. Even if the pump is arranged outside the drive axle, the installation space for the electric motor is insufficient in terms of the required size. In addition, arranging the pump outside the drive axle necessitates a complicated angular drive.

The present invention is based on the object of providing a drive axle of the type mentioned at the beginning with improved utilization of the installation space available.

SUMMARY OF THE INVENTION

According to the invention, this object is achieved in that the electric motor is arranged at right angles to the traction motors, as based on the longitudinal centre line of the drive axle.

This design makes it possible to enlarge the electric motor for the hydraulic pump with a predefined external diameter, specifically to lengthen it, and therefore equip it with sufficient power. Furthermore, the pump to be driven by the electric motor can be coupled to the electric motor without any angular deflection (coaxial arrangement of the electric motor and the pump) even if it is arranged outside the drive axle for space reasons.

If the drive axle has a lateral insertion opening for the electric motor, the mounting of the electric motor or a subassembly formed of the electric motor and the hydraulic pump is very simple.

The angular position in which the electric motor is located, as viewed in cross section through the drive axle, is in principle unimportant. In a preferred embodiment, the electric motor is arranged horizontally in the drive axle, for example in such a way that, in the case of a counterweight fork stacker, it can be pulled rearwards out of the lateral insertion opening for repair work, without previously having to disassemble a lifting mast arranged in front of the drive axle.

In an advantageous development of the invention, it is possible for the traction motors and/or the electric motor to be constructed as a three-phase synchronous motor.

Synchronous motors are relatively short in the axial direction, while they have a relatively larger diameter than asynchronous motors, necessitated by the design.

Given the same installation space, the power is greater and the losses are lower than in the case of asynchronous motors.

Likewise, it is in principle also possible to construct the aforementioned motors as three-phase asynchronous motors, DC motors or other types of electric motors.

BRIEF DESCRIPTION OF THE DRAWINGS

Further advantages and details of the invention will be explained in more detail using the exemplary embodiment illustrated in the schematic figures, in which.

DESCRIPTION OF THE PREFERRED EMBODIMENT

Figure 1:
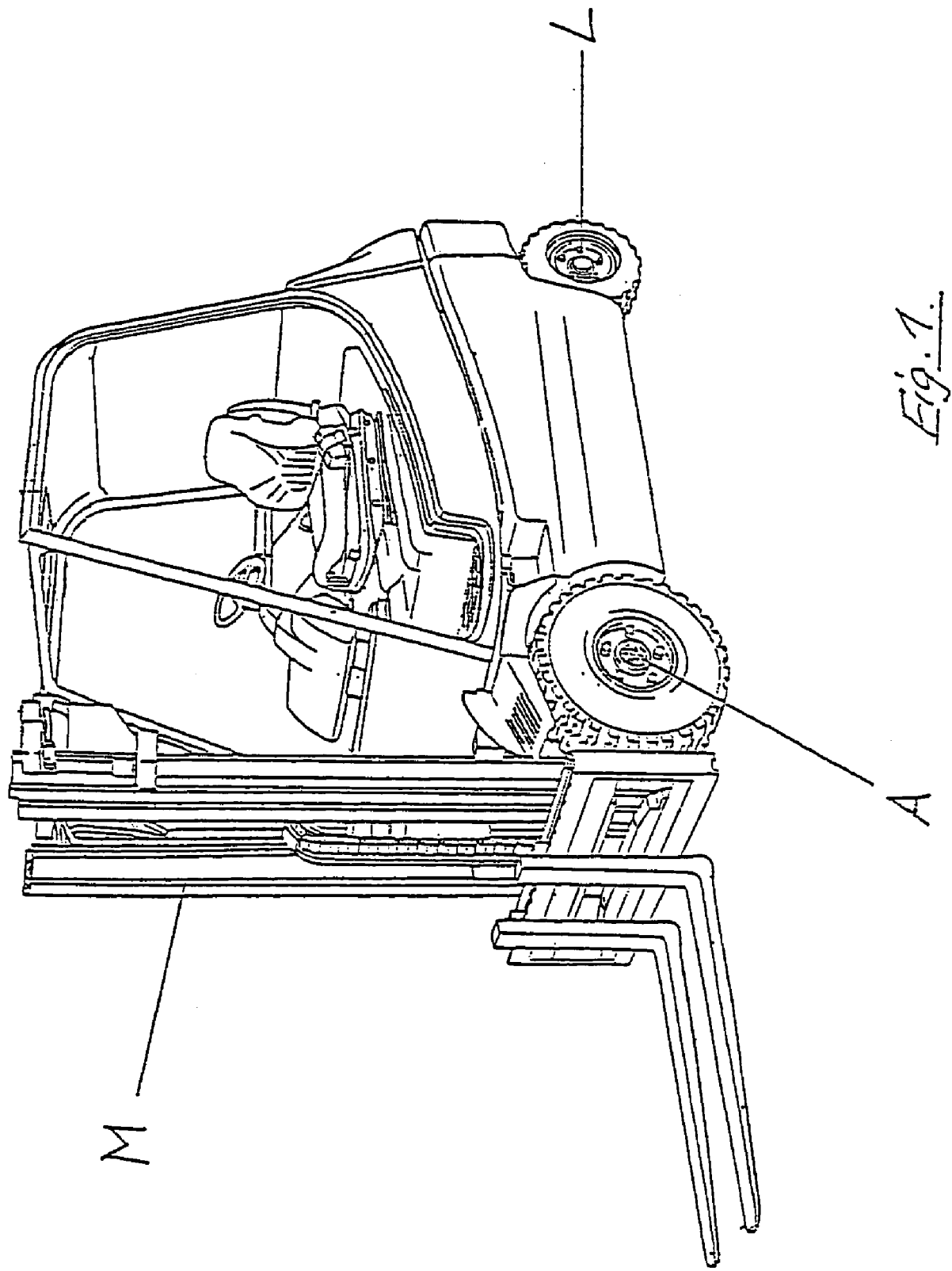
FIG. 1 shows a perspective illustration of an industrial truck.

FIG. 1 illustrates a self-propelled work machine which, in the present exemplary embodiment, is designed as a battery electric counterweight fork stacker and has operating hydraulics (lifting cylinder and tilting cylinder of a lifting frame M arranged on the front side) and steering hydraulics (actuating a steered axle L arranged at the rear). The traction drive of the fork stacker has a drive axle A arranged at the front side, of which the basic structure emerges from FIG. 2.

Figure 2:
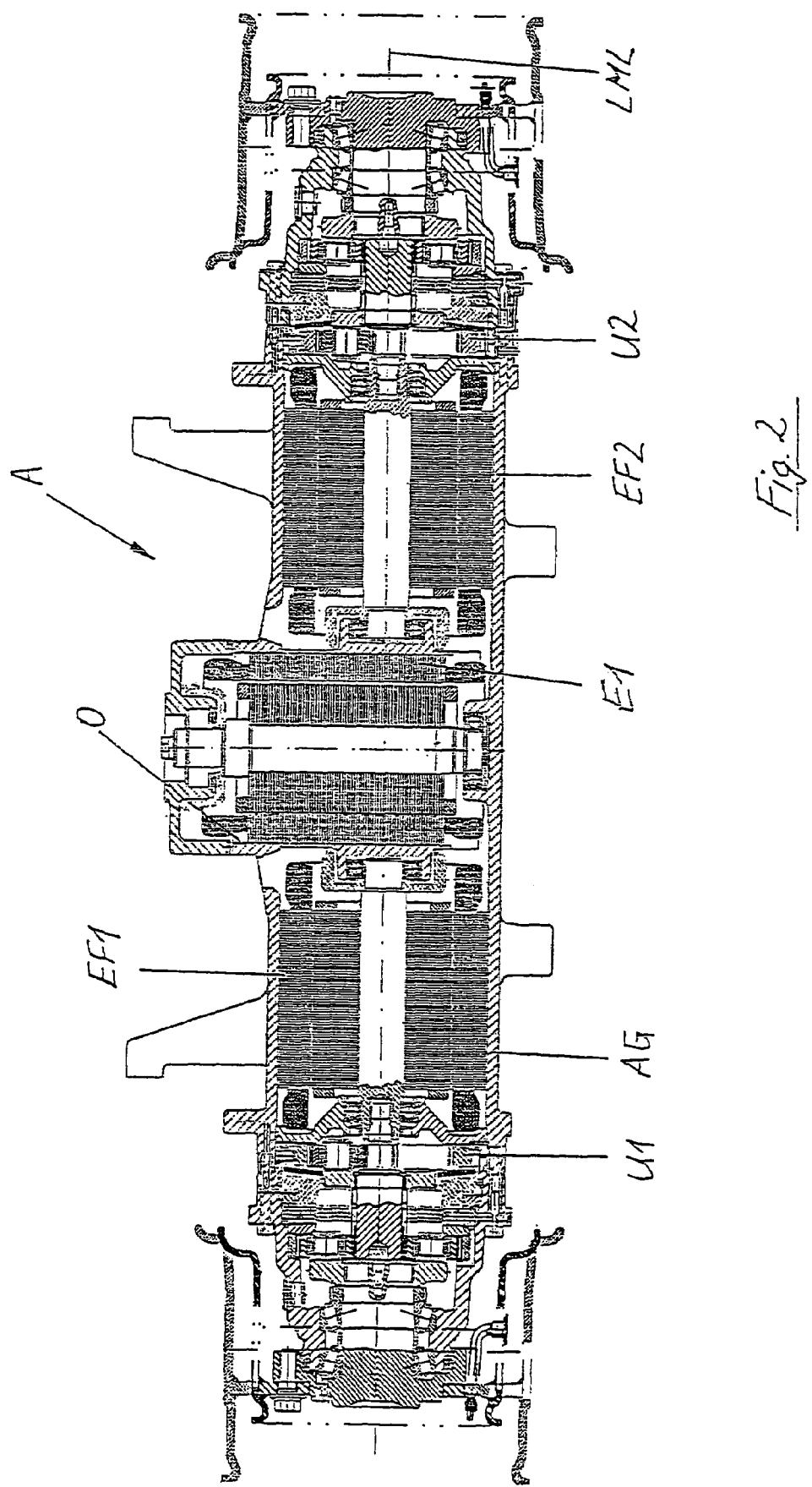
FIG. 2 shows a longitudinal section through a drive axle according to the invention, which is provided for installation in the industrial truck according to FIG. 1.

FIG. 2 shows a horizontal longitudinal section through a drive axle A according to the invention. In each case a wheel is arranged at the two ends of the drive axle A (a tandem design is also possible), which is driven by an electric traction motor EF1 and EF2, respectively, downstream of which a two-stage step-down gearbox U1 and U2 (here epicyclic gearboxes) with integrated multi-plate brake is connected. The two traction motors EF 1 and EF2 are arranged coaxially with each other and spaced apart from each other in an axle housing AG. Located axially between them is an electric motor E1, which is provided to drive a pump that supplies the operating hydraulics and, according to the invention, is arranged at right angles to the traction motors EF1 and EF2, as based on the longitudinal centre line LML of the drive axle A.

This design makes it possible to dimension the electric motor E1 to be sufficiently large, in spite of the relatively small installation space which is available between the two traction motors EF1 and EF2. If required, the electric motor E1 can project laterally out of an insertion opening O of the drive axle A. In the most beneficial case, both the electric motor E1 and the pump driven by it and belonging to the operating hydraulics, which is not illustrated in FIG. 2, are integrated completely in the drive axle A. In this case, a power controller for the electric motor E1 can be flange-mounted on the drive axle A, for example on the outside.

Both the two traction motors EF1 and EF2 and also the electric motor E1 are preferably constructed as three-phase synchronous motors.

The invention claimed is:

1. A drive axle for a self-propelled work machine, comprising:
   two traction motors integrated into the drive axle and spaced apart from each other; and
   an electric motor integrated into the drive axle and arranged axially in between the traction motors, wherein the electric motor is configured to drive a hydraulic pump, and wherein the electric motor is arranged at right angles to the traction motors with respect to a longitudinal center line of the drive axle.

2. The drive axle according to claim 1, wherein the drive axle has a lateral insertion opening for the electric motor.

3. The drive axle according to claim 1, wherein the electric motor is arranged horizontally in the drive axle.

4. The drive axle according to claim 2, wherein the electric motor is arranged horizontally in the drive axle.

5. The drive axle according to claim 1, wherein the traction motors and/or the electric motor are constructed as a three-phase synchronous motor.

6. The drive axle according to claim 2, wherein the traction motors and/or the electric motor are constructed as a three-phase synchronous motor.

7. The drive axle according to claim 3, wherein the traction motors and/or the electric motor are constructed as a three-phase synchronous motor.

8. The drive axle according to claim 4, wherein the traction motors and/or the electric motor are constructed as a three-phase synchronous motor.

9. The drive axle according to claim 1, wherein the work machine is an industrial truck.

* * * * *